United States Patent [19]

Erdmannsdörfer et al.

[11] 4,324,572
[45] Apr. 13, 1982

[54] SOOT FILTER FOR AN EXHAUST ARRANGEMENT OF AN INTERNAL COMBUSTION ENGINE

[75] Inventors: Hans Erdmannsdörfer, Ludwigsburg; Horst Bergmann, Esslingen; Helmut Daudel, Schorndorf, all of Fed. Rep. of Germany

[73] Assignee: Daimler-Benz Aktiengesellschaft, Stuttgart, Fed. Rep. of Germany

[21] Appl. No.: 237,899

[22] Filed: Feb. 25, 1981

[30] Foreign Application Priority Data

Feb. 29, 1980 [DE] Fed. Rep. of Germany ....... 3007642

[51] Int. Cl.³ .................. B01D 46/02; F01N 3/02
[52] U.S. Cl. ................................. 55/385 R; 55/484; 55/489; 55/492; 55/512; 55/520; 55/524; 55/527; 55/DIG. 30; 60/311
[58] Field of Search ............... 55/492, 520, 527–528, 55/DIG. 30, 489, 477, 524, 512, 484, 385 R, 385 B; 60/311

[56] References Cited

U.S. PATENT DOCUMENTS

| | | | |
|---|---|---|---|
| 2,008,560 | 7/1935 | Nutting | 55/492 X |
| 2,574,221 | 11/1951 | Modigliani | 55/489 X |
| 2,780,363 | 2/1957 | Pew | 55/520 UX |
| 2,823,117 | 2/1958 | Labino | 55/527 X |
| 3,051,602 | 8/1962 | Schairbaum | 55/527 X |
| 3,398,837 | 8/1968 | Adams | 55/520 X |
| 3,843,561 | 10/1974 | Sobel | 55/520 X |
| 3,857,688 | 12/1974 | Wisnewski | 55/524 X |
| 3,918,945 | 11/1975 | Holloway et al. | 55/DIG. 30 X |
| 4,205,971 | 6/1980 | Abthoff et al. | 60/311 X |
| 4,248,929 | 2/1981 | Morgan et al. | 55/524 X |

FOREIGN PATENT DOCUMENTS

| | | | |
|---|---|---|---|
| 2810937 | 9/1979 | Fed. Rep. of Germany | 55/527 |
| 618 | of 1897 | United Kingdom | 55/492 |
| 28635 | of 1908 | United Kingdom | 55/492 |

Primary Examiner—Kathleen J. Prunner
Attorney, Agent, or Firm—Craig and Antonelli

[57] ABSTRACT

A soot filter arrangement for an exhaust gas flow of an internal combustion engine, especially an air-compressing internal combustion engine. The filter arrangement includes a housing with feed and discharge connections for the exhaust gas stream in a mineral filter material arranged in the housing. The material is provided on a support pipe equipped with passage openings which enable the exhaust gas stream to enter the support pipe in a radial direction and leave the same in an axial direction. Several support pipes are provided at a mutual spacing in a parallel relationship and the filter material includes a thread of spun silicon dioxide fibers wound onto the support pipes.

19 Claims, 7 Drawing Figures

SOOT FILTER FOR AN EXHAUST ARRANGEMENT OF AN INTERNAL COMBUSTION ENGINE

The present invention relates to a filter and, more particularly, to a soot filter adapted to be disposed in an exhaust flow of an internal combustion engine, especially an air compressing internal combustion engine, which filter includes a housing provided with feed and discharge connections for the exhaust flow and a mineral filter material arranged in the housing, which material is provided on a support pipe equipped with passage openings, with the exhaust gas stream entering the support pipe in a radial direction and leaving the same in an axial direction.

A soot filter of the aforementioned type is proposed in, for example, Offenlegungsschrift No. 27 50 960, wherein a mineral filter material consists of an external layer of loose ceramic-fiber wool and an internal layer of woven ceramic fiber mat which lies on a support pipe provided with passage openings. In order to prevent the filter material from altering its position, mesh wires are additionally arranged between the material and the support pipe and also an external support pipe is included.

A disadvantage of the above proposed filter arrangement resides in the fact that by virtue of the provision of the external support pipe, a free surface area of the filter material is restricted and thus the desired self-cleaning action by burn-off is considerably reduced.

The aim underlying the present invention essentially resides in providing a soot filter arrangement adapted to be arranged in an exhaust flow or exhaust gas stream of an internal combustion engine which enables large surface areas of filter material to come directly into contact with the exhaust gases streaming into the filter without the danger of the filter material being blown or carried away in the exhaust gas stream.

In accordance with advantageous features of the present invention, several support pipes are provided and are disposed in parallel at a mutual spacing with the respective pipes being sealed at one end. Threads of spun silicon dioxide or silica fiber are wound on the several support pipes. In accordance with the present invention, it is advantageously possible to substantially increase the total surface area of filter material through which the exhaust gases must pass. Since the filter material is wound onto the support pipes as a thread, external supporting means, which, in turn, would reduce the surface area of the filter, are eliminated.

In accordance with further advantageous features of the filter arrangement of the present invention, the thread of silica fibers may be cross-wound onto the support pipes so that amounts of oxygen sufficient for the combustion of soot deposits may have access thereto.

Advantageously, a thread spacing of the cross-wound filter body may be about 0.2-1.0 mm. and the thread proper may have a diameter of 0.7-1.0 mm. Additionally, the thread may be roughened and may be impregnated with temperature-resistant agents on an inorganic base in order to attain higher mechanical strength.

Advantageously, in accordance with the present invention, the support pipes may be mounted in the housing unilaterally so that they can expand toward one side and may be equipped with radially outwardly oriented corrugations in order to avoid a shifting of the cross-wound thread on the support pipes.

If the soot filter arrangement of the present invention is to be arranged in close proximity to the internal combustion engine, the housing may be provided with preferably outwardly directed peripheral corrugations in order to compensate for expansion and shrinking displacements.

In order to enable the soot filter arrangement to be directly attached to a cylinder head of the internal combustion engine, bushings may be arranged in the housing of the filter in order to accommodate fastening members such as screws or bolts.

Accordingly, it is an object of the present invention to provide a filter arrangement adapted to be disposed in the exhaust flow of an internal combustion engine which avoids, by simple means, shortcomings and disadvantages encountered in the prior art.

Another object of the present invention resides in providing a filter arrangement adapted to be disposed in an exhaust flow of an internal combustion engine which maximizes the surface area of the filter material directly exposed to the exhaust gases.

Yet another object of the present invention resides in providing a filter arrangement adapted to be disposed in an exhaust flow of an internal combustion engine which avoids a blowing or carrying away of the filter material by the exhaust gas stream.

A still further object of the present invention resides in providing a filter arrangement adapted to be disposed in an exahust flow of an internal combustion engine which dispenses with the need for providing supporting means for maintaining the filter material in the exhaust gas flow.

A still further object of the present invention resides in providing a filter arrangement adapted to be disposed in an exhaust flow of an internal combustion engine which is simple in construction and therefore relatively inexpensive to manufacture.

These and other objects, features, and advantages of the present invention will become more apparent from the following description when taken in connection with the accompanying drawings which show, for the purposes of illustration only, several embodiments in accordance with the present invention, and wherein.

Figure 1:
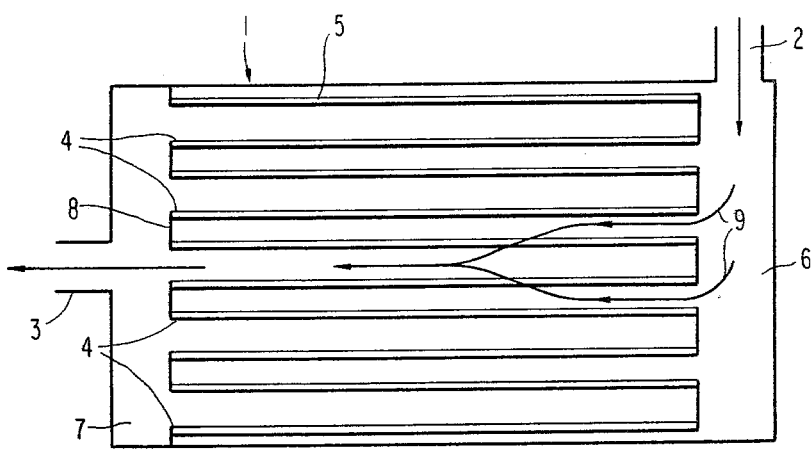
FIG. 1 is a schematic view of a soot filter arrangement in accordance with the present invention adapted to be disposed in an exhaust flow of an internal combustion engine, with the filter arrangement having a radial feed connection and an axial discharge connection.

Referring now to the drawings wherein like reference numerals are used throughout the various views to designate like parts and, more particularly, to FIG. 1, according to this figure, a soot filter adapted to be disposed in an exhaust flow or exhaust gas stream of an internal combustion engine includes a housing generally designated by the reference numeral 1 having at one end thereof a raidally connected feed connection or nipple 2 and at the other end a central axially directed discharge connection or nipple 3. A plurality of support pipes 4, provided with passage openings, are arranged in the housing 1 at a mutual spacing and are disposed in a parallel relationship with respect to one another. Filter material 5, consisting of a wound thread of spun silicon dioxide or silica fibers is arranged on each of the support pipes 4. The support pipes 4 are sealed toward a space 6 disposed in a zone of the feed connection 2 and open at the other end toward a space 7 disposed in a region of the discharge connection 3. Walls 8 are disposed between the support pipes 4 at the open ends thereof in order to prevent exhaust gas, entering the space 6, from passing in between the support pipes 4 and along the latter directly into the space 7. Thus, the exhaust gas must enter the support pipes 4 in a manner shown by the arrows 9 through the filter material 5 and then pass from the support pipes 4 into the space 7.

Figure 2:
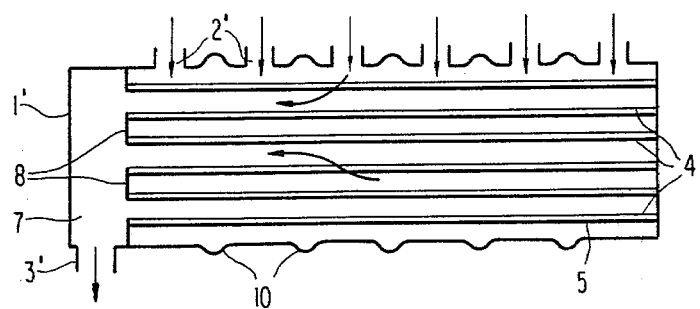
FIG. 2 is a schematic view, on an enlarged scale, of another embodiment of a soot filter arrangement in accordance with the present invention provided with several radial feed connections and one radial discharge connection.

The soot filter arrangement of FIG. 2 includes a housing generally designated by the reference numeral 1' which is provided with a plurality of radial feed connections or nipples 2' for direct connection to an exhaust member of an internal combustion engine, such as, for example, an exhaust manifold, and a radial discharge connection 3'. Support pipes 4 are disposed within the housing 1' with a filter material 5 being arranged on the respective support pipes. One end of the support pipes 4 is unilaterally connected to an end wall of the housing 1', with the other end of the respective support pipes 4 being open toward the space 7 in a zone of the discharge connection 3'. Walls 8 force the exhaust gases entering the housing 1' to flow through the filter material 5 into the support pipes 4 so only those exhaust gases may leave the housing 1' from which soot and other contaminants have been deposited in the filter material 5. Outwardly projecting corrugations 10 are provided on the housing in order to enable a compensation for expansion and shrinking of the housing 1'.

Figure 3:
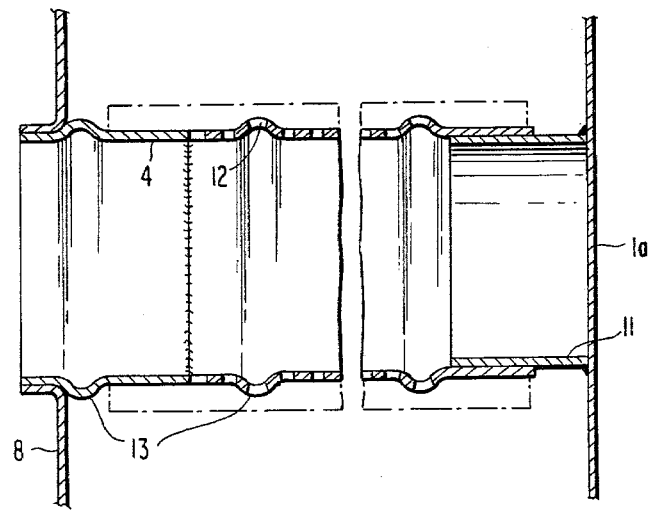
FIG. 3 is an enlarged detailed view of an arrangement and construction of a support pipe of the soot filter arrangement of FIG. 2.
Figure 4:
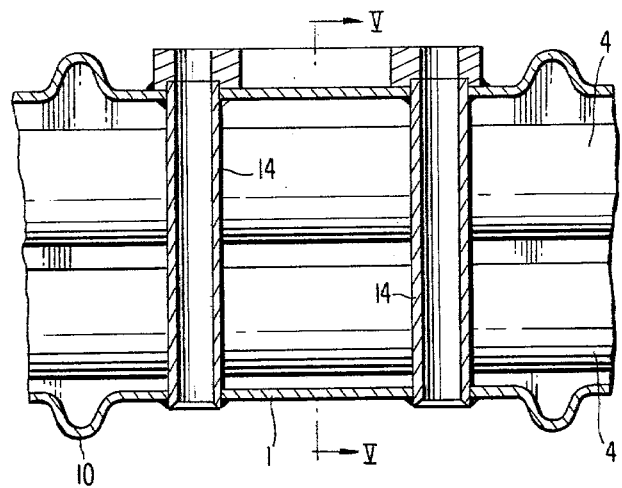
FIG. 4 is a longitudinal cross-sectional view through a soot filter arrangement corresponding to FIG. 2.
Figure 5:
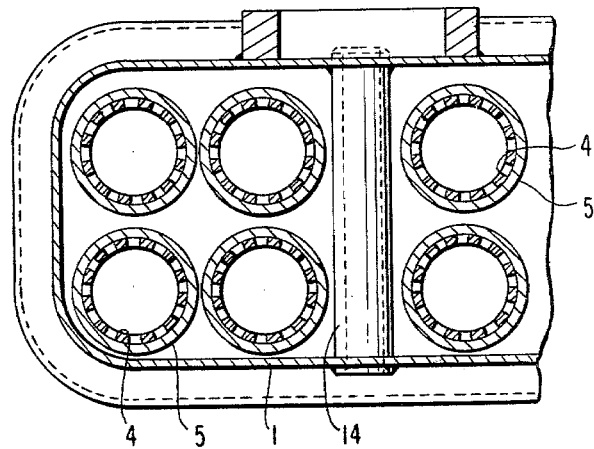
FIG. 5 is a cross-sectional view, on an enlarged scale, taken along the line of V—V of FIG. 4.

As shown in FIG. 3, each support pipe 4 of the filter arrangement of FIG. 2 is welded to the wall 8 with the other end of the support pipe being merely pushed onto a nipple 11 fixedly mounted at the housing wall 1a so as to compensate for thermal expansions. Support pipe 4 is provided with a plurality of passage openings 12, the number and size of which may be adapted so as to attain maximally identical flow velocities in the filter without an appreciable pressure loss. Outwardly directed peripheral corrugations 13 are provided at each of the support pipes 4, with the corrugations 13 serving for a positional stabilization of the filter material 5. To enable a direct connection of the filter to a cylinder head of the internal combustion engine, as shown in FIGS. 4 and 5, bushing numbers 14 may be arranged in the housing 1 or 1' for enabling an insertion of penetrating bolts or screws through the housing.

Figure 6:
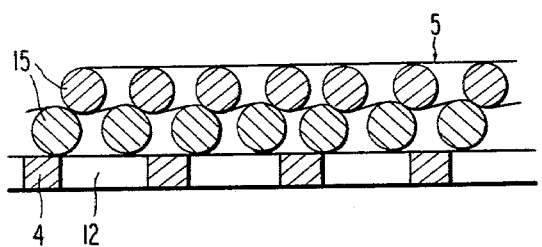
FIG. 6 is a longitudinal cross-sectional view through a supporting pipe and cross-winding of a filter material in accordance with the present invention.
Figure 7:
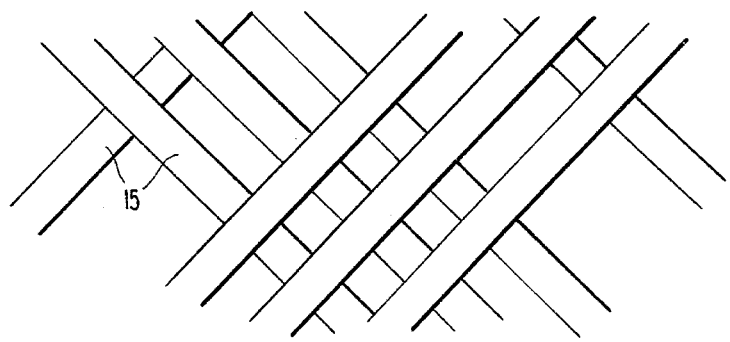
FIG. 7 is a top view of the cross-winding of FIG. 6.

As shown in FIGS. 6 and 7, the filter material 5 is a thread 15 of spun silicon dioxide or silica fibers wound onto the support pipes 4. The thread 15 may be roughened and a thread spacing of the cross-wound filter body ranges between 0.2 and 1 mm. Advantageously, the diameter of the thread 15 ranges between 0.7 and 1 mm., and the fibers of which the thread 15 is spun have a diameter of about 9 $\mu$m.

While we have shown and described several embodiments in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. A filter arrangement for an exhaust gas flow of an internal combustion engine, the filter arrangement including a housing provided with feed means for enabling a feeding of the exhaust gas flow into the housing, discharge means for enabling a discharge of the exhaust gas flow from the housing, and filter material disposed between said feed and discharge means and arranged in the housing such that the entire exhaust gas flow flows through said filter material to reach said discharge means, characterized in that a support means is provided for supporting the filter material in the housing so as to be exposed to the exhaust gas flow, and in that the filter material includes a thread spun of silicon dioxide fibers wound onto the support means.

2. A filter arrangement according to claim 1, characterized in that a plurality of mutually spaced parallel disposed support means are provided, each support means is formed as a support pipe, said thread being wound onto each support pipe, and means are provided in each of the support pipes for enabling the exhaust gas flow to radially enter and axially leave the respective support pipes.

3. A filter arrangement according to claim 2, characterized in that the thread is cross-wound onto each of the support pipes to form a filter body.

4. A filter arrangement according to claim 3, characterized in that the thread spacing of the filter body is between about 0.2–1.0 mm.

5. A filter arrangement according to claim 4, characterized in that the thread has a diameter of between about 0.7–1.0 mm.

6. A filter arrangement according to one of claims 3, 4, or 5, characterized in that the thread is roughened.

7. A filter arrangement according to claim 6, characterized in that the individual fibers of the thread have a diameter of about 9 $\mu$m.

8. A filter arrangement according to claim 7, characterized in that the thread is impregnated with an inorganic temperature-resistant agent.

9. A filter arrangement according to claim 8, characterized in that means are provided for unilaterally attaching the support pipes to the housing.

10. A filter arrangement according to claim 9, characterized in that means are provided in each of the support pipes for positionally stabilizing the filter material thereon.

11. A filter arrangement according to claim 10, characterized in that the stabilizing means includes a plurality of spaced outwardly directed peripheral corrugations.

12. A filter arrangement according to claim 10, characterized in that means are provided for enabling a direct mounting of the housing on the internal combustion engine.

13. A filter arrangement according to claim 12, characterized in that the direct mounting means includes bushings arranged in the housing.

14. A filter arrangement according to claim 12, characterized in that the internal combustion engine is an air-compressing internal combustion engine.

15. A filter arrangement according to claim 1, characterized in that the thread is cross-wound on the support means to form a filter body.

16. A filter arrangement according to claim 15, characterized in that the thread spacing of the filter body is between about 0.3–1.0 mm.

17. A filter arrangement according to claim 16, characterized in that the thread has a diameter of between about 0.7–1.0 mm.

18. A filter arrangement according to claim 17, characterized in that the individual fibers of the thread have a diameter of about 9 μm.

19. A filter arrangement according to claim 18, characterized in that the thread is roughened.

* * * * *